P. O. PETERSON.
Bee-Hives.

No. 157,103. Patented Nov. 24, 1874.

Witnesses
John L. Boone
C. M. Richardson

Inventor
Peter Ole Peterson
by Dewey & Co
Attys.

UNITED STATES PATENT OFFICE.

PETER O. PETERSON, OF OAKLAND, CALIFORNIA.

IMPROVEMENT IN BEE-HIVES.

Specification forming part of Letters Patent No. 157,103, dated November 24, 1874; application filed September 10, 1874.

*To all whom it may concern:*

Be it known that I, PETER OLE PETERSON, of Oakland, Alameda county, State of California, have invented an Improved Bee-Hive; and I do hereby declare the following description and accompanying drawings are sufficient to enable any person skilled in the art or science to which it most nearly appertains to make and use my said invention or improvement without further invention or experiment.

My invention consists in a device for preventing the moth from entering the hive.

In order to more fully illustrate and explain my invention, reference is had to the accompanying drawing forming a part of this specification, in which—

Figure 1:
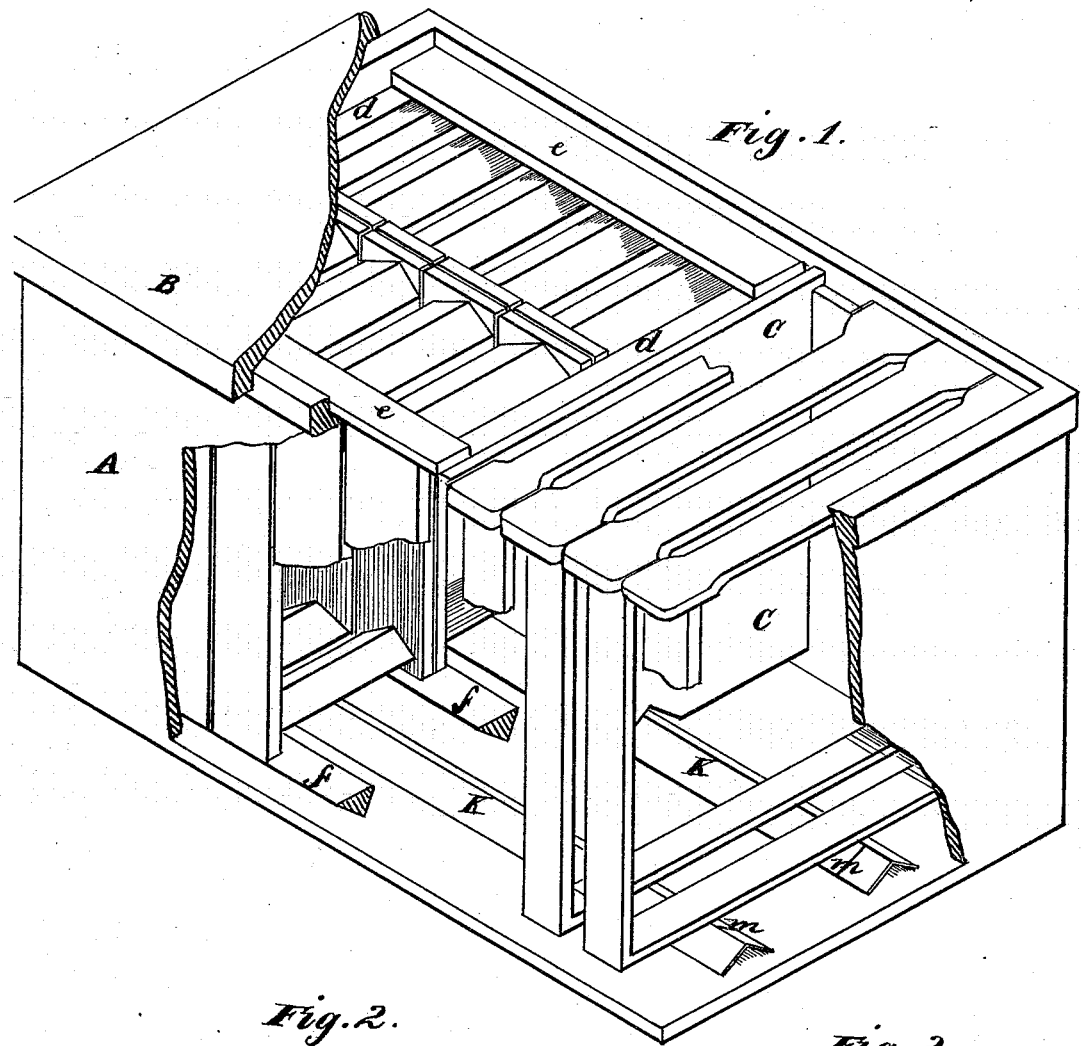
Figure 2:
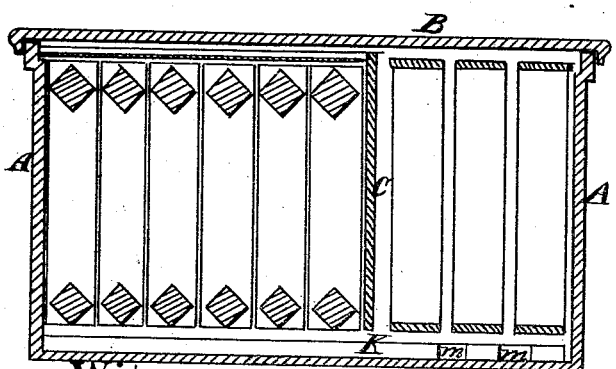
Figure 3:
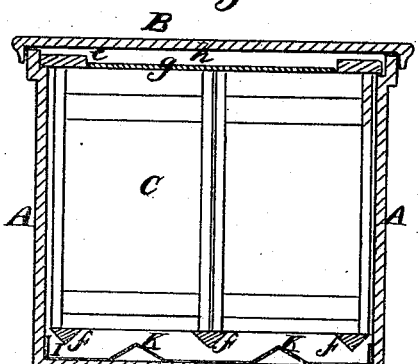

Figure 1 is a perspective view of my hive with a part broken away. Fig. 2 is a longitudinal elevation. Fig. 3 is a transverse section.

A is the hive, which is provided with a removable cover, B. The front part of this hive I provide for breeding purposes, and separate it from the working or rear compartment by means of a partition, c, which is suspended from the ledge which supports the honey and breeding frames, so that its lower end or edge will be about three-sixteenths of an inch from the bottom of the hive.

The female or working bees, it is well known, are much smaller than the male bees or drones, so that they can pass through a much smaller opening. This limited opening will, therefore, compel the non-producing bees to remain in the breeding-compartment, as they cannot pass beneath the partition.

In the working-compartment I place a frame, consisting of two boards, d d, which form the sides of the frames, and which are united together at the top by a strip of wood, e, at each end, and at the bottom by three triangular strips, f, one at each end and one in the middle. This frame is just large enough to fit snugly in the space behind the partition c, with one of the boarded sides next to the partition. This frame is just wide enough to contain two rows of honey-frames, as shown at Fig. 3. Each row of honey-frames is supported by an outer strip and one-half of the middle strip f.

By this arrangement either of the honey-frames can be readily removed, when filled, without disturbing the unfilled frames, as they can easily be slipped out at one side and a fresh frame slipped in, when desired.

Upon the open upper end of the frame I place a plate of glass, g, which will fit between the cross-strips e, and upon this glass I place a board, h, so that by removing the board the progress of the work can be examined.

To prevent the moth from entering the hive I construct a small metal drawer, I, which will slide into the bottom of the hive, just below the breeding and honey frames. In this pan or drawer I secure one or more metal tunnels, K, by bending a piece of sheet metal to the form of a V, and, after inverting it, secure its edges to the bottom of the pan. Near the bee-hole or entrance into the hive I cut away two or more openings, m, in this tunnel, at short distances apart.

The bee-moth, being naturally afraid of the bees, and in the habit of entering the first opening it comes to, will enter the tunnel through the openings m, and lay its eggs in the tunnel.

The tunnel being made of metal, the eggs will not hatch out, but can be removed occasionally by withdrawing the drawer and cleaning it out.

The tunnel also serves as an aid to the bee in destroying the moth, as it can readily get the moth in a corner of the tunnel (from whence it has no means of escape except past the bee) and kill it.

The lower end of the partition c is adapted to the tunnels by being cut out in a V shape, so as to fit over them and leave the space of three-sixteenths of an inch between them.

By this means I provide a greatly superior bee-hive, in which the working of the bees can be readily controlled and inspected.

Having thus described my invention, what I claim, and desire to secure by Letters Patent, is—

The metal drawer or pan I, with its tunnels K, having the openings m, and arranged in the lower part of a bee-hive, substantially as and for the purpose described.

In witness whereof I hereunto set my hand and seal.

PETER OLE PETERSON. [L. S.]

Witnesses:
J. L. BOONE,
C. M. RICHARDSON,